United States Patent [19]

Barnes et al.

[11] Patent Number: 4,548,861
[45] Date of Patent: Oct. 22, 1985

[54] FOAM RIGIDIZING PROCESS AND PRODUCTS PRODUCED THEREWITH

[75] Inventors: John M. Barnes, Milwauke, Oreg.; Robert G. Haley, Auburn; George E. Trepus, Jr., Enumclaw, both of Wash.

[73] Assignee: The Boeing Company, Seattle, Wash.

[21] Appl. No.: 537,728

[22] Filed: Sep. 29, 1983

[51] Int. Cl.[4] .................. C08G 18/14; B32B 5/18; B32B 3/26; B29J 1/02
[52] U.S. Cl. .................. 428/322.7; 264/45.3; 264/46.4; 264/257; 521/54; 521/55; 428/309.9; 428/317.9; 428/320.2; 523/137
[58] Field of Search .................. 521/55, 54; 264/45.3, 264/46.4; 428/309.9, 317.9, 320.2, 322.7

[56] References Cited

U.S. PATENT DOCUMENTS

| | | | |
|---|---|---|---|
| 2,194,036 | 3/1940 | Talalay | 264/46.5 |
| 2,770,864 | 11/1956 | Weese | 264/42 |
| 3,047,888 | 8/1962 | Shecter et al. | 5/481 |
| 3,086,247 | 4/1963 | Rubens | 521/55 |
| 3,094,433 | 6/1963 | Bugosh et al. | 521/55 |
| 3,193,441 | 7/1965 | Schafer | 264/257 |
| 3,193,598 | 7/1965 | Schafer | 264/54 |
| 3,341,640 | 9/1967 | Rosenerantz | 264/46.4 |
| 3,353,994 | 11/1967 | Welsh et al. | 521/55 |
| 3,382,302 | 5/1968 | Marzocchi | 264/257 |
| 3,464,872 | 9/1969 | Everett | 428/309.9 |
| 3,915,783 | 10/1975 | Goppel et al. | 428/322.7 |
| 3,917,547 | 11/1975 | Massey | 521/155 |
| 3,944,704 | 3/1976 | Dirks | 428/322.7 |
| 3,989,781 | 11/1976 | Chant | 264/46.4 |
| 3,993,608 | 11/1976 | Wells | 428/313.9 |
| 3,996,654 | 12/1976 | Johnson | 29/458 |
| 4,082,704 | 4/1978 | Rudner et al. | 428/320.2 |
| 4,171,410 | 10/1979 | Froeb | 428/317.9 |
| 4,208,696 | 6/1980 | Lindsay et al. | 428/316.6 |
| 4,239,564 | 12/1980 | Krumweide | 156/79 |
| 4,258,100 | 3/1981 | Fujitani et al. | 428/316.6 |
| 4,362,778 | 12/1982 | Andersson et al. | 428/240 |
| 4,419,261 | 12/1983 | Takahashi | 521/55 |

FOREIGN PATENT DOCUMENTS

| | | | |
|---|---|---|---|
| 1808349 | 5/1970 | Fed. Rep. of Germany | 264/46.5 |
| 1076130 | 7/1967 | United Kingdom | 521/55 |

Primary Examiner—Herbert S. Cockeram
Attorney, Agent, or Firm—Hughes, Barnard & Cassidy

[57] ABSTRACT

A composite, rigid, structural, foam panel (11) comprising: (i) a flexible, non-structural, open cell reticulated or semi-reticulated, foam sheet (10); and (ii), an essentially closed cell resinous foam formed from a flowable, foamable material (12); and, wherein the open cell non-structural foam sheet (10) and the essentially closed cell foam are each coextensive with the volume of spaced defined by the panel (11). In a preferred embodiment of the invention, the flexible, non-structural, open cell reticulated or semi-reticulated foam sheet (10) comprises an electromagnetic wave absorber and, consequently, the essentially closed cell rigid structural panel (11) produced comprises a rigid, structural electromagnetic wave absorber. The rigid panels and/or absorbers (11) of the present invention are preferably formed of urethane-like materials and in a process embodying the invention wherein: a flowable, foamable, resinous material (12) composed of Components "A" and "B" and a suitable cream are proportioned to form a panel (11) of the desired shape; the Components are thoroughly stirred, and introduced into the bottom of a preheated, vented mold (15) having suitable vents (19); the open cell flexible foam sheet (10), precut to the desired size, is inserted into the mold (15) on top of the flowable, foamable, resinous material (12); the lid (18) of the mold (15) is closed and clamped in place; and, the reactive Components "A" and "B" are allowed to foam and expand in an exothermic reaction, whereby the expanding material (12) is forced into, entirely through, and entirely throughout the open cell foam sheet (10) with excess material (12) escaping from the mold (15) through the vents (19). After curing at room temperature for at least two hours, the panel (11) is demolded and trimmed as required.

22 Claims, 6 Drawing Figures

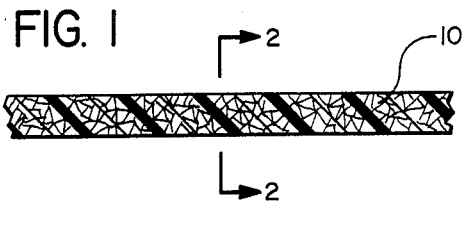 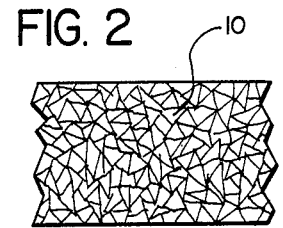
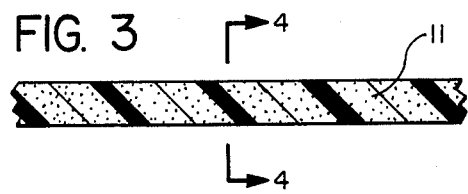 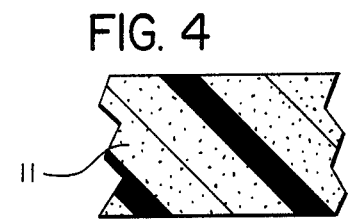
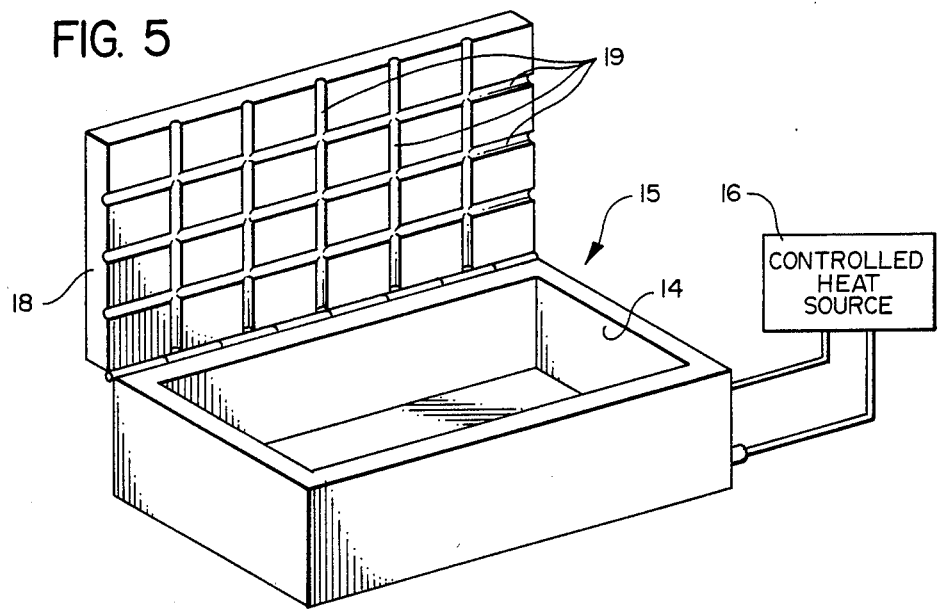
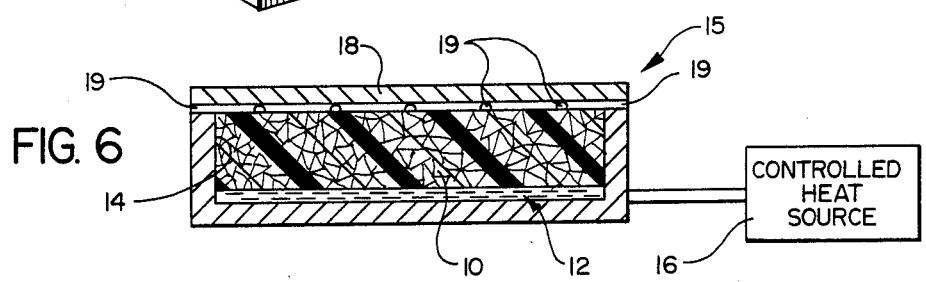

FOAM RIGIDIZING PROCESS AND PRODUCTS PRODUCED THEREWITH

BACKGROUND OF THE INVENTION

1. Technical Field

The present invention relates generally to composite, lightweight, rigid, structural panels formed of resinous material and to a process for forming the same; and, more particularly, to a process for rigidizing a non-structural, flexible, open cell, reticulated or semi-reticulated, foam sheet formed of resinous material, such, for example, as urethane, polyurethane, or the like, and to rigid structural composite foam products produced thereby. In one of its important aspects, the invention finds particularly advantageous use in rigidizing commercially available, non-structural, flexible, open cell foams of the type preloaded with dielectric and/or magnetic particles distributed throughout the open cell foamed structure for use as electromagnetic wave absorbers.

2. Background Art

Prior to the advent of the present invention, numerous open cell, reticulated or semi-reticulated, non-structural foams have been commercially available; and, such foams have been used for a number of non-structural purposes. For example, one common use of such foams has been as an electromagnetic wave absorber; and, to this end, the flexible, non-structural, open cell foam sheet material has served as a matrix-like support for dielectric and/or magnetic particles distributed throughout the open cells of the foam sheet. Unfortunately, while such products have been highly effective as electromagnetic wave absorbers, they have all been characterized by their inability to function as a load-bearing structural element. Indeed, such open cell, non-structural, foam products have been highly parasitic in nature, requiring the use of a separate rigid structural support to which the open cell foam sheet can be laminated and wherein the open cell foam sheet and its matrix of discrete dielectric and/or magnetic particles contributes to the thickness, bulk and weight of the rigid support while providing no enhancement of the load-bearing characteristics thereof. Moreover, such open cell foam products require separate laminating techniques, materials and operations to enable their attachment to a rigid structural support; and, once laminated thereto, are prone to damage and/or contamination during use as a result of exposure of the surface of the flexible open cell structure to environmental contaminants and/or conditions.

Because of the foregoing disadvantages, numerous efforts have been made to rigidize such foam sheets, all without success prior to the present invention. Such efforts have involved, for example, squeezing or compressing the foam sheet material and placing the thus compressed material in a liquid rigidizer bath so that upon expansion to the original noncompressed state, the foam sheet material will hopefully soak up or absorb the liquid rigidizer, much like a sponge. This approach has, however, proven unsuccessful and suffers from numerous disadvantages. For example, squeezing or compressing the open cell foam sheet tends to break down the cell walls and thus damages the foam and its integrity as a matrix-like support for dielectric and/or magnetic particles. Moreover, the process has not resulted in a uniform dispersion of the liquid rigidizer throughout the open cell non-structural foam sheet; and, consequently, the resulting product does not have uniform strength or load bearing characteristics. Moreover, this process does not readily lend itself to formation of rigidized products having any desired non-planar configuration.

Yet another approach has involved efforts to force the liquid rigidizer under pressure into the non-structural open cells of the foam sheet from opposite faces thereof. However, this process has invariably produced a product wherein the rigidizer not only is not uniformly distributed throughout the open cell foam sheet; but, moreover, wherein the central region of the sheet has little or no rigidizer therein.

Numerous somewhat related processes and/or equipment for reinforcing resinous products are described in prior patents. For example, U.S. Pat. No. 3,989,781-Chant discloses a process for producing a laminar product including a resin impregnated fibrous reinforcing material. In this process, the patentee contemplates impregnating a foam sheet with a curable thermosetting resin, positioning a fibrous reinforcing layer on one or both faces of the impregnated foam sheet, positioning the adjacent laminations thus formed within a closed mold, and introducing a resinous expandable polyurethane foam into the closed mold so that expansion of the polyurethane foam causes the resin impregnated in the foam sheet to be expressed out of the foam sheet and into the adjacent fibrous reinforcing lamination(s) so as to form a composite laminar product having: (i) at least one rigid lamination of fibrous reinforced hardened thermosetting resin; (ii) a rigid layer of compressed foam impregnated with hardened resin; and (iii), a layer of polyurethane foam. The patentee suggests (Col. 2, 11. 50-51) that the rigid resin in the fibrous reinforcing layer(s) forms a hard rigid skin on the polyurethane foam.

In U.S. Pat. No. 3,341,640-Rosencarntz, the patentee discloses a process for forming pad bodies such as seats or backs for furniture, mattresses, cushions, or the like. In this process, the patentee employs a core of foamed material such as polyurethane and, particularly, polyurethane polyethers, which is positioned on upwardly projecting pins in the bottom of a mold cavity while the lid of the mold is provided with similar downwardly projecting pins dimensioned to touch, but not penetrate, the core. Thereafter, a foamable rubber material is introduced into the mold in surrounding relation to the polyurethane core and allowed to cure so as to form a composite product having a central polyurethane core and an outer coating of foamed rubber or the like wherein the outer coating includes depressions and/or openings in the regions occupied by the mold pins.

U.S. Pat. No. 2,770,864-Weese is of general interest for its disclosure of a method for producing a molded self-rising cellular concrete or like cellular material of any desired configuration wherein the material is placed within a mold-like cavity and covered by a perforate screen or lid, thus enabling the material to expand through the perforations and permitting the operator to redistribute the excess material to regions where the material has not filled the mold cavity.

A somewhat similar process is disclosed in U.S. Pat. No. 4,239,564-Krumweide, wherein the patentee forms a uniform, low density, constant thickness, foam material sheet on a structural surface by positioning a screen in a plane parallel to and spaced above the structural surface, and then spraying or otherwise applying the foam material through the screen to substantially fill the space between the structural surface and the screen. The screen is thereafter stripped from the product, leaving a uniform, constant thickness, foam lamination on the structural surface which is bonded thereto during curing.

Other patents of interest include: U.S. Pat. No. 3,047,888-Shecter et al [a mattress or other laminar product having a central lamination of high hysteresis, low recovery rate, urethane foam, and outer facing laminations of resilient foam rubber or urethane]; U.S. Pat. Nos. 3,917,547-Massey, 3,993,608-Wells, 3,996,654-Johnson, and 4,362,778-Andersson et al [patents which disclose various methods and/or products wherein particles, spheres or the like are distributed throughout the foam material]; and, U.S. Pat. Nos. 4,208,696-Lindsay et al, and 4,258,100-Fujitani et al [wherein electrically conductive laminar webs are provided containing a centrally conductive layer which, in the Lindsay et al patent, comprises a latex or resin coated scrim or open cell foam containing carbon particles, to which are bonded outer layers of thermoplastic polymers or fibrous material].

However, none of the foregoing processes and/or equipment disclose a system for rigidizing a non-structural, open cell, reticulated or semi-reticulated foam by forcing a flowable foamable resinous material into and through the open cell foam structure.

SUMMARY OF THE INVENTION

Composite, lightweight, rigid, structural panels formed of resinous materials and a process for forming the same are disclosed which are particularly, but not exclusively, suitable for use as, and in the forming of, electromagnetic wave absorbers and the like; and, wherein the rigid, composite, structural panel formed includes an open cell, reticulated or semi-reticulated, non-structural foam sheet which may or may not serve as a matrix-like support for dielectric and/or magnetic particles, and an essentially closed cell structural foam completely filling the interstices of the open cell non-structural foam wherein both the open cell non-structural foam and the closed cell structural foam are coextensive with the volume of space occupied by the finished composite rigid panel. More specifically, composite, rigid, structural panels are formed in a process for rigidizing a pre-existing flexible open cell, non-structural, foam sheet wherein: (i) the non-structural, flexible, open cell foam sheet is positioned within a vented mold containing a flowable foamable resinous material; (ii) the vented mold is closed; and (iii), the flowable foamable resinous material is heated and expanded in an exothermic reaction with the heat and pressure generated causing the flowable foamable expanding resinous material to expand into, through and throughout the non-structural open cell foam sheet with excess expanding foamed resinous material escaping from the mold through the vents therein and with the thus formed product thereafter being curved to form a rigid, structural, composite product having an open cell non-structural foam material and an essentially closed cell, structural, foam material each coextensive with the volume of space occupied by the rigid structural panel.

More specifically, it is a general aim of the present invention to provide a process for rigidizing non-structural open cell foam materials by insuring uniform distribution of an essentially closed cell structural foam material throughout the interstices of the open cell foam.

A more detailed objective of the invention is the provision of a process for rigidizing non-structural open cell foam sheets which insures effective, uniform distribution of a rigidizing material throughout the foam sheet, yet wherein the cellular walls of the open cell foam sheet are not broken and wherein any dielectric and/or magnetic particles distributed throughout the open cell foam sheet are not displaced.

A further objective of the invention is the provision of a lightweight electromagnetic wave absorber, and a process for forming the same, wherein the electromagnetic wave absorber is characterized by its strength, rigidity and durability and is capable of functioning on its own as a load-bearing support element without requiring lamination to a separate support panel.

In another of its important aspects, it is an object of the invention to provide rigidized, structural, foam panels from non-structural, open cell, foam sheets of material, and processes for forming the same, which readily permit the formation of rigid, structural panels of any desired size and/or configuration and which can be either planar or non-planar.

DESCRIPTION OF THE DRAWING

These and other objects and advantages of the present invention will become more readily apparent upon reading the following detailed description and upon reference to the attached drawing, in which:

FIG. 1 is a fragmentary vertical section through a sheet of open cell reticulated or semi-reticulated non-structural foam material formed of urethane or the like prior to rigidizing thereof in accordance with the present invention;

FIG. 2 is an enlarged sectional view taken substantially along the line 2—2 of FIG. 1 and here illustrating the open cell structure of the highly flexible foam sheet;

FIG. 3 is a fragmentary vertical sectional view through the same open cell reticulated or semi-reticulated foam material shown in FIG. 1 following substantially uniform dispersion through the open cells of a flowable foamable resinous material having the characteristics which produce an essentially closed cell, rigid structural foam panel in accordance with the process of the present invention;

FIG. 4 is an enlarged vertical sectional view taken substantially along the line 4—4 of FIG. 3, and here particularly illustrating the essentially closed cell structure of the rigid structural foam product produced in accordance with the present invention;

FIG. 5 is a highly diagrammatic perspective view of a suitable vented mold employed in the foam rigidizing process of the present invention; and, FIG. 6 is a vertical sectional view through the mold of FIG. 5 just prior to initiation of a foam rigidizing process in accordance with the invention, and here illustrating the mold with its vented lid closed and containing a flowable foamable resinous material upon which has been placed a sheet of open cell reticulated or semi-reticulated non-structural foam of the type shown in FIGS. 1 and 2.

While the invention is susceptible to various modifications and alternative forms, a specific embodiment thereof has been shown by way of example in the drawing and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Turning now to the drawing, there has been illustrated in FIGS. 1 and 2 a fragmentary portion of a completely conventional, non-structural, open cell, resilient, resinous foam sheet 10. The particular resinous material from which such sheet is formed may vary widely and is not critical to the present invention; but, when used to provide a matrix-like support for dielectric and/or magnetic particles to form a conventional electromagnetic wave absorber, such material will commonly be formed of urethane, polyurethane, or similar synthetic resins or plastic materials of the type capable of being foamed to form a lightweight, non-structural, flexible, open cell, reticulated or semi-reticulated sheet 10. When used as an electromagnetic wave absorber, such open cell foam sheets 10 include a multiplicity of dielectric and/or magnetic particles (not shown in FIGS. 1 or 2) which are distributed throughout the cellular sheet material. A typical, but non-limiting and non-exhaustive example of such a non-structural, flexible, open cell, electromagnetic wave absorber available in the marketplace is known as an Emerson Cummings LS 24 absorber which is approximately 1.5" in thickness. Such materials are available in a wide range of thicknesses and in widely varying densities from various sources.

Those skilled in the art will appreciate that non-structural, open cell, foamed sheets of the foregoing types are quite flexible, non-self-supporting, and incapable of functioning as a load-bearing element. Consequently, when used for their intended purposes, they must be laminated to, or otherwise affixed to, a separate rigid structural element (not shown in the drawing). But, under normal circumstances, the open cell foam sheet 10 will be exposed to environmental conditions; and, consequently, it is highly prone to damage and/or impregnation with foreign environmental contaminants.

Turning to FIGS. 3 and 4, there has been illustrated a rigid structural panel 11 formed in accordance with the process of the present invention and embodying the features thereof. As here shown, such panel 11 has been formed by employing a flowable, foamable, resinous material characterized by its ability to form a rigid, essentially closed cell, structural panel, and by forcing such flowable, foamable, resinous material into, entirely through, and entirely throughout the open cell structure of the sheet 10 depicted in FIGS. 1 and 2; and, therefore, curing the composite material to form a rigid structural panel 11 characterized by the inclusion of: (i) an open cell, non-structural, flexible sheet 10 (FIGS. 1 and 2); and (ii), such foamed, essentially closed cell, resinous material; and, wherein both the open cell, non-structural, foam sheet 10 and the essentially closed cell, structural, foamed material are coextensive with the volume of space defined by the panel 11. As with the open cell foam sheet 10, the particular flowable, foamable, resinous material employed may vary widely without departing from the spirit and scope of the invention; but, excellent results have been obtained utilizing a urethane or polyurethane material.

In carrying out the present invention, the flowable, foamable, resinous material, generally indicated at 12 in FIG. 6, is placed within the mold cavity 14 of a suitable mold 15 coupled to any suitable heat source 16 and spread therein to a relatively uniform thickness. Immediately thereafter, the flexible, non-structural, open cell, foam sheet 10 (FIGS. 1 and 2) is positioned within mold 15 on top of the material 12; and, the lid 18 of the mold is closed, as best shown in FIG. 6, and clamped in its closed position by any suitable means (not shown).

In keeping with one of the important aspects of the present invention, the mold 15—which can be of any desired configuration, including mating mold elements of non-planar configuration (not shown)—is preferably vented in any suitale fashion at a mold surface remote from the surface on which the flowable, foamable, resinous material 12 is spread. In the illustrative form of the invention depicted in FIGS. 5 and 6, this is accomplished by forming the undersurface of the lid 18 with a series of intersecting, transverse and longitudinally extending grooves 19 in a waffle iron-type arrangement; but, wherein the grooves 19 extend the entire width and breadth of the lid 18 so as to define vents communicating between the interior of the mold 15 and the exterior thereof when the lid 18 is closed, as best shown in FIG. 6.

Thus, the arrangement is such that upon foaming of the flowable, foamable, resinous material 12 (FIG. 6) in a conventional exothermic reaction, particularly in the presence of heat as might be generated by employing heat source 16 to preheat the mold 15 to a temperature in the range of from about 85° F. to about 100° F., the heat and pressure generated causes the expanding flowable, foamable, resinous material 12 to expand into, entirely through, and entirely throughout the interstices of the non-structural, open cell, foam sheet 10, with excess foamed resinous material escaping from the vented mold 15 through the vents defined by grooves 19.

Thereafter, the foamed materials are allowed to cure at room temperature, preferably for a period of at least two hours, prior to being removed from the mold 15. When removed from the mold 15, the resulting product comprises a rigid, structural, lightweight panel of the type 11 shown in FIGS. 3 and 4. The ridges and/or burrs or other irregular projections formed as a result of the inclusion of vents in the mold 15—e.g., the intersecting grooves 19—may, if desired, be removed through any conventional machining operation or the like to form a smooth surfaced panel. And of course, in those instances where the non-structural, open cell, foamed sheet 10 comprises a conventional, flexible, electromagnetic wave absorber, the resultant panel comprises a rigid structural electromagnetic wave absorber which does not require lamination to separate structural elements. Nevertheless, the panel may, if desired, be laminated to such separate structural elements—for example, to the walls, ceiling and/or floor of a test facility where it is desired to prevent the escape of electromagnetic waves—in which event the panel will perform a dual function—viz., it will serve to not only absorb electromagnetic waves, but, additionally to enhance the strength of the structural member to which it is attached. Because of its rigid, durable, structural characteristics, the panel 11 of the present invention is not prone to damage and/or impregnation by environmental contaminants.

Those skilled in the art will appreciate that the mold 15 can take any of a wide variety of other shapes than that indicated in FIGS. 5 and 6; and, consequently, it is possible to form molded panels of any desired size or shape. Moreover, other means for venting the interior can be employed, including, merely by way of example, provision of vertical through holes (not shown) in the lid 18 of the mold 15.

EXAMPLE

A mold of the type generally indicated at 15 in FIGS. 5 and 6 having a mold cavity 1.5″ deep, 6″ wide and 55″ long was thoroughly cleaned to remove all contamination and residues from previous molding operations. The mold was coated with polyvinyl alcohol solution which functioned as a release agent and was preheated to a temperature on the order of about 90° F. A piece of Emerson & Cuming LS 24 electromagnetic wave absorber 1.5″ thick was cut into a flexible rectangular sheet 6″ wide and 55″ in length. The Components "A" and "B" of a General Plastics "Last-A-Foam" 6703 flowable, foamable, resinous material having a two minute cream were proportioned to form a 1.5″×6″×55″ panel by adding 1949 grams of "Component A" to 1949 grams of "Component B" while both Components A and B were maintained at a temperature above 70° F. The two components were immediately stirred for 30 seconds with a 3″ diameter shearing stirrer at 1250 rpm. The mixed Components A and B were then rapidly poured into the bottom of the mold, leveling as necessary by trowel or screeding. The precut Emerson & Cuming LS 24 absorber was then placed in the mold over the leveled Components taking care to prevent the mixed Components from splashing or overflowing the sides of the mold. The lid of the mold was then closed and clamped in place. The mixed reactive Components A and B were permitted to rise into and through the Emerson & Cuming LS 24 absorber with excess reactive components exiting from the mold through the vents. The materials were then allowed to cure for two hours at room temperature, demolded and trimmed.

The resulting produce comprised a rigid, structural panel 1.5″×6″×55″ and was characterized by the presence of the open cell Emerson & Cuming LS 24 electromagnetic wave absorber and the foamed, essentially closed cell, General Plastics "Last-A-Foam" 6703, each being coextensive with the volume of space defined by the panel.

Thus, those skilled in the art will appreciate that there has herein been disclosed a simple, yet highly effective, process for rigidizing non-structural, flexible, open cell, reticulated or semi-reticulated foam structures, including such structures as are employed in electromagnetic wave absorbers; and, wherein the resulting panel has significant structural load-bearing characteristics. When employing an open cell, flexible, non-structural, electromagnetic wave absorber, the resulting rigidized panel performs a dual function—viz., it serves to not only absorb electromagnetic waves but, additionally, to impart structural stability and load-bearing strength characteristics to whatever structural element it is used in conjunction with.

What is claimed is:

1. The method of rigidizing a non-structural, flexible, open cell foam sheet comprising the steps of:
   (a) forming a flowable foamable resinous material characterized by its ability to produce a rigid structural element when foamed and cured;
   (b) placing the flowable foamable resinous material in a heated vented mold defining a given predetermined volume of space;
   (c) positioning a non-structural, flexible, open cell foam sheet within the heated vented mold in face-to-face relation with the flowable foamable resinous material and wherein the non-structural, flexible, open cell foam sheet is in the non-compressed state and essentially fills the given predetermined volume of space within the mold;
   (d) closing the heated vented mold and permitting the flowable foamable resinous material to expand and form in an exothermic reaction whereby the heat and pressure generated cause the flowable foamable resinous material to expand into and uniformly through and throughout the non-structural, flexible, open cell, non-compressed foam sheet without compressing and/or damaging the cellular walls of the open cell non-compressed foam sheet and with excess foamed resinous material escaping from the vented mold through the vents therein; and,
   (e) curing the uniformly impregnated open cell foam sheet and the expanded foamed resinous material impregnated therein to form a composite structural panel comprising: (i) a non-structural, flexible, open cell foam sheet having the same dimensions as when initially positioned within the mold in step (c); and (ii), a rigid essentially closed cell structural foam uniformly dispersed throughout the interstices of the non-structural, flexible, open cell, non-compressed foam sheet.

2. The method of rigidizing a non-structural, flexible, open cell foam sheet comprising the steps of:
   (a) forming a flowable foamable resinous material characterized by its ability to produce a rigid structural element when foamed and cured;
   (b) placing the flowable foamable resinous material in a vented mold defining a given predetermined volume of space;
   (c) positioning a non-structural, flexible, open cell foam sheet within the vented mold in face-to-face relation with the flowable foamable resinous material and wherein the non-structural, flexible, open cell foam sheet is in the non-compressed state and essentially fills the given predetermined volume of space within the mold;
   (d) closing the vented mold;
   (e) heating the closed vented mold and the flowable foamable resinous material therein to cause the flowable foamable resinous material to expand and foam in an exothermic reaction whereby the heat and pressure generated cause the flowable foamable resinous material to expand into and uniformly through and throughout the non-structural, flexible, open cell, non-compressed foam sheet without compressing and/or damaging the cellular walls of the open cell non-compressed foam sheet and with excess foamed resinous material escaping from the heated vented mold through the vents therein; and,
   (f) curing the uniformly impregnated open cell foam sheet and the expanded foamed resinous material impregnated therein to form a composite structure panel comprising: (i) a non-structural, flexible, open cell foam sheet having the same dimensions as when initially positioned within the mold in step (c); and (ii), a rigid essentially closed cell structure foam uniformly dispersed throughout the interstices of the non-structural, flexible, open cell, non-compressed foam sheet.

3. The rigid composite structural panel formed by the method set forth in claims 1 or 2.

4. The method of rigidizing a non-structural, flexible, open cell foam sheet as set forth in claims 1 or 2 wherein the non-structural, flexible, open cell foam sheet comprises a matrix-like support for a multiplicity of dielectric and/or magnetic particles, and the rigidized, composite, structural panel formed is an electromagnetic wave absorber.

5. The rigidized structural electromagnetic wave absorber formed by the method set forth in claim 4.

6. The method of rigidizing a non-structural, flexible, open cell foam sheet as set forth in claims 1 or 2 wherein the open cell foam sheet is formed of polyurethane material.

7. The method of rigidizing a non-structural, flexible, open cell foam sheet as set forth in claims 1 or 2 wherein the flowable foamable resinous material comprises polyurethane material.

8. The method of rigidizing a non-structural, flexible, open cell foam sheet as set forth in claims 1 or 2 wherein the open cell foam sheet and the flowable foamable resinous material are each formed of polyurethane material.

9. The method of rigidizing a non-structural, flexible, open cell foam sheet as set forth in claims 1 or 2 wherein the mold is heated to a temperature in the range of from about 85° F. to about 100° F.

10. The method of rigidizing a non-structural, flexible, open cell foam sheet as set forth in claims 1 or 2 wherein the composite panel produced is cured at room temperature for a minimum of two hours.

11. The method of rigidizing a non-structural, flexible, open cell foam sheet as set forth in claims 1 or 2 wherein the non-structural, flexible, open cell foam sheet and the expanded foamed resinous material are each coextensive with the volume of space defined by the rigid structural panel produced.

12. The method of rigidizing a non-structural, flexible, open cell foam sheet as set forth in claims 1 or 2 wherein the rigid structural panel formed is machined to remove ridges, burrs and/or projections thereon in the regions of the mold vents to provide a smooth rigid structural panel capable of functioning as a load-bearing element.

13. A lightweight, rigid, structural panel comprising, in combination, a non-structural, flexible, open cell, non-compressed foam sheet which occupies a given predetermined volume of space and an essentially closed cell structural foam uniformly distributed throughout the interstices of said open cell non-structural, flexible, non-compressed foam sheet so as to form a structural panel occupying essentially the same given predetermined volume of space as said non-structural, flexible, open cell, non-compressed foam sheet.

14. A lightweight, rigid, structural panel as set forth in claim 13, wherein said open cell foam sheet is formed of polyurethane material.

15. A lightweight, rigid, structural panel as set fortth in claim 13, wherein said essentially closed cell structural foam is formed of polyurethane material.

16. A lightweight, rigid, structural panel as set forth in claim 13, wherein said open cell foamed sheet and said essentially closed cell structural foam are each formed of polyurethane material.

17. A lightweight, rigid, structural panel as set forth in claim 13, wherein said non-structural, flexible, open cell, non-compressed foam sheet and said essentially closed cell structural foam are each coextensive with the volume of spaced defined by said panel.

18. A lightweight, rigid, electromagnetic wave absorber comprising, in combination:
(a) a non-structural, flexible, open cell foam sheet which occupies a given predetermined volume of space and which is in the non-compressed state, said open cell foam sheet having a multiplicity of dielectric and/or magnetic particles dispersed throughout the open cell structure of said foam sheet which forms a matrix-like support therefore; and,
(b) an essentially closed cell structural foam uniformly distributed throughout the interstices of said non-structural, flexible, open cell, non-compressed foam sheet so as to form a lightweight, rigid, electromagnetic wave absorber occupying essentially the same given predetermined volume of space as said non-structural, flexible, open cell, non-compressed foam sheet.

19. A lightweight, rigid, electromagnetic wave absorber as set forth in claim 18, wherein said open cell foam sheet is formed of polyurethane material.

20. A lightweight, rigid, electromagnetic wave absorber as set forth in claim 18, wherein said essentially closed cell structural foam is formed of polyurethane material.

21. A lightweight, rigid, electromagnetic wave absorber as set forth in claim 18, wherein said non-structural, flexible, open cell foam sheet and said essentially closec cell structural foam are each formed of polyurethane material.

22. A lightweight, rigid, electromagnetic wave absorber as set forth in claim 18, wherein said non-structural, flexible, open cell, non-compressed foam sheet and said essentially closed cell structural foam are each coextensive with the volume of space defined by said electromagnetic wave absorber.

* * * * *